(12) United States Patent
Shin (10) Patent No.: US 7,936,486 B2
(45) Date of Patent: May 3, 2011

(54) TRANSFERRING GUIDE DEVICE USABLE WITH IMAGE READING SENSOR UNIT AND SCANNING APPARATUS HAVING THE SAME

(75) Inventor: Sang-yob Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1806 days.

(21) Appl. No.: 11/086,468

(22) Filed: Mar. 23, 2005

(65) Prior Publication Data

US 2005/0243385 A1 Nov. 3, 2005

(30) Foreign Application Priority Data

Apr. 28, 2004 (KR) ........................ 10-2004-0029357

(51) Int. Cl.
*H04N 1/04* (2006.01)

(52) U.S. Cl. ........ 358/474; 358/497; 358/486; 399/213; 271/314; 271/186

(58) Field of Classification Search .................. 358/474, 358/501, 505, 497, 496, 494, 486; 399/213; 271/314, 186
See application file for complete search history.

(56) References Cited

U.S. PATENT DOCUMENTS

| | | | | |
|---|---|---|---|---|
| 4,704,638 A | * | 11/1987 | Igarashi | 358/296 |
| 5,592,308 A | * | 1/1997 | Fujiwara | 358/497 |
| 5,760,924 A | * | 6/1998 | Takahara et al. | 358/474 |
| 5,778,277 A | * | 7/1998 | Wenthe et al. | 399/31 |
| 6,075,960 A | * | 6/2000 | Uchida | 399/212 |
| 6,108,108 A | * | 8/2000 | Peng | 358/497 |
| 6,285,441 B1 | * | 9/2001 | Takahara | 355/67 |
| 7,072,082 B2 | * | 7/2006 | Yokota | 358/497 |
| 7,119,933 B2 | * | 10/2006 | Sugimoto | 358/474 |
| 7,202,980 B2 | * | 4/2007 | Hayashi | 358/475 |
| 7,253,930 B2 | * | 8/2007 | Hendrix et al. | 358/474 |
| 7,420,716 B2 | * | 9/2008 | Aoyama et al. | 358/474 |

FOREIGN PATENT DOCUMENTS

| | | |
|---|---|---|
| JP | 10-262135 | 9/1998 |
| JP | 11-168592 | 6/1999 |
| JP | 2001-77983 | 3/2001 |
| JP | 2001-133906 | 5/2001 |
| JP | 2002-214721 | 7/2002 |
| JP | 2002-262032 | 9/2002 |
| JP | 2003-158614 | 5/2003 |

* cited by examiner

*Primary Examiner* — Negussie Worku (74) *Attorney, Agent, or Firm* — Stanzione & Kim, LLP

(57) ABSTRACT

A transferring guide device usable with an image reading sensor unit of a scanning apparatus includes a guide holder installed at the image reading sensor unit and a guide rail installed at a scanning apparatus body. The guide holder slide-contacts the guide rail, and slide contact surfaces on which the guide holder contacts the guide rail are plane. The guide holder point-contacts or line-contacts the guide rail, and as a result, a friction force between the guide holder and the guide rail is weak.

28 Claims, 8 Drawing Sheets

TRANSFERRING GUIDE DEVICE USABLE WITH IMAGE READING SENSOR UNIT AND SCANNING APPARATUS HAVING THE SAME

CROSS-REFERENCE TO RELATED APPLICATIONS

This application claims the benefit under 35 U.S.C. §119 of Korean Patent Application No. 2004-29357, filed on Apr. 28, 2004, in the Korean Intellectual Property Office, the disclosure of which is incorporated herein in its entirety and by reference.

BACKGROUND OF THE INVENTION

1. Field of the Invention

The present general inventive concept relates to a scanning apparatus, and more particularly, to a transferring guide device to guide transferring of an image reading sensor unit reading an image, and a scanning apparatus having the same.

2. Description of the Related Art

In general, image processing apparatuses having a scanning unit, such as scanners, facsimiles, digital copy machines, and the like, include an image reading sensor unit for reading an image from an original document. The image reading sensor unit irradiates light onto the original document and converts the light reflected from the original document into an electric output value via an image reading sensor, such as a charge coupled device (CCD) or a contact image sensor (CIS).

Figure 1:
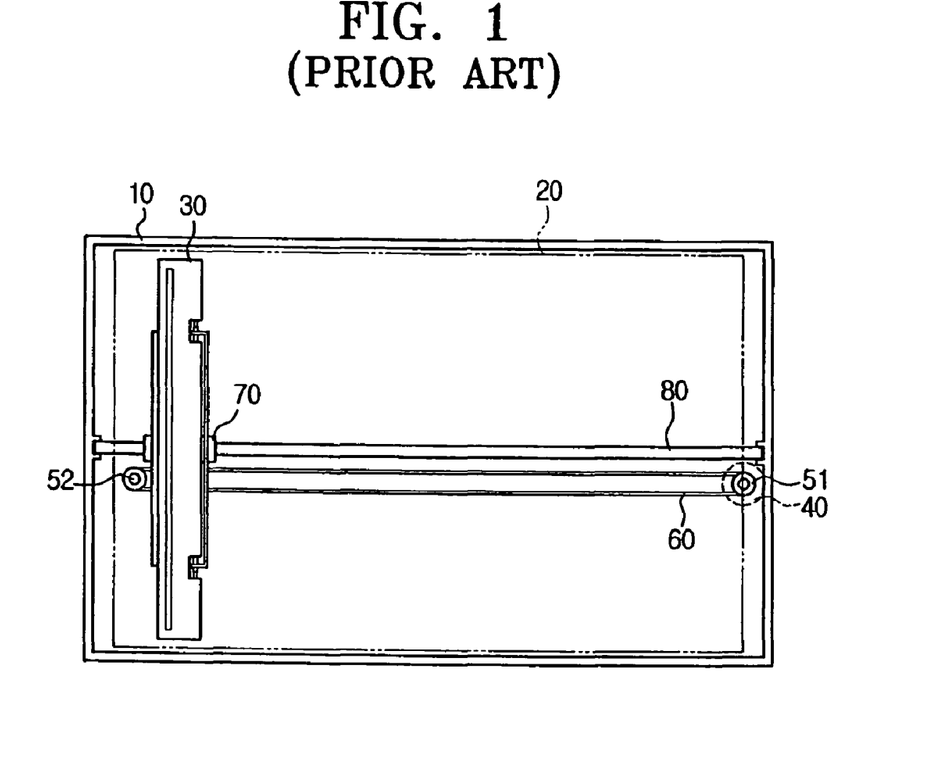
FIG. 1 is a schematic view illustrating a conventional scanning apparatus.
Figure 2:
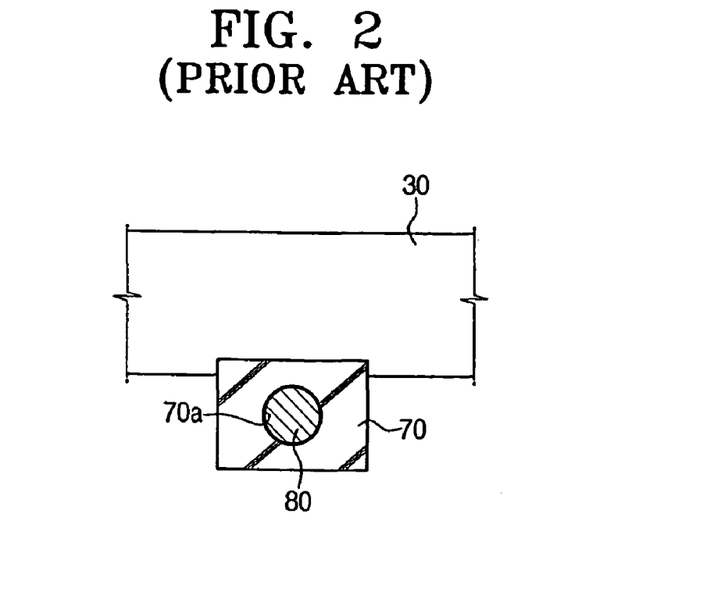
FIG. 2 is a view illustrating a guide holder of the conventional scanning apparatus of FIG. 1.

FIGS. 1 and 2 schematically illustrate a conventional scanning apparatus. Referring to FIG. 1, a transparent document board 20 is installed on an upper surface of a scanning apparatus body 10, and an image reading sensor unit 30 is installed under the transparent document board 20. Also, a motor 40 is installed at the scanning apparatus body 10, and a driving power of the motor 40 is transmitted to the image reading sensor unit 30 via a pair of driving pulleys 51 and 52 and a timing belt 60.

As shown in FIGS. 1 and 2, a guide holder 70 is installed at the image reading sensor unit 30. The guide holder 70 includes an insertion hole 70a into which a guide shaft 80 installed under the document board 20 is inserted.

Accordingly, when the motor 40 is driven, the guide shaft 80 guides the image reading sensor unit 30 to transfer the image reading sensor unit 30 in a horizontal direction of the document board 20.

However, in the conventional scanning apparatus, an inner surface of the insertion hole 70a of the guide holder 70 contacts an outer perimetric surface of the guide shaft 80. Thus, when the image reading sensor unit 30 is transferred, a friction force is created between the inner surface of the insertion hole 70a of the guide holder 70 and the outer perimetric surface of the guide shaft 80. The friction force causes the guide holder 70 to be partially worn. Therefore, when the guide holder 70 is used for a long period of time, the guide holder 70 becomes partially worn. As a result, a linear transfer of the image reading sensor unit 30 becomes instable.

Also, an outer diameter of the guide shaft 80 and an inner diameter of the insertion hole 70a of the guide holder 70 must be minutely fabricated. Thus, manufacturing time and costs are high.

SUMMARY OF THE INVENTION

Accordingly, the present general inventive concept provides a transferring guide device usable with an image reading sensor unit to guide transferring of the image reading sensor unit while capable of reducing a friction force between elements as well as manufacturing time and costs, and a scanning apparatus having the transferring guide device.

Additional aspects and advantages of the present general inventive concept will be set forth in part in the description which follows and, in part, will be obvious from the description, or may be learned by practice of the general inventive concept.

The foregoing and/or other aspects and advantages of the present general inventive concept are achieved by providing a transferring guide device to guide transferring of an image reading sensor unit movably installed in a scanning apparatus body. The transferring guide device includes a guide holder installed at the image reading sensor unit and a guide rail installed at the scanning apparatus body. Here, the guide holder slide-contacts the guide rail, and slide contact surfaces on which the guide holder contacts the guide rail are plane.

The slide contact surfaces may be formed at the guide rail, and the guide holder may include a guide groove and at least one contact protrusion or contact ribs protruding from the guide groove.

The slide contact surfaces may be formed at the guide rail, and the guide rail may include a guide groove and at least one contact rib protruding from the guide groove.

The guide rail may include a guide groove, the slide contact surfaces may be formed at the guide groove, and the guide holder may include contact protrusions or contact ribs contacting the slide contact surfaces.

The guide holder may include a guide groove, the slide contact surfaces may be formed at the guide groove, and the guide rail may include contact ribs contacting the slide contact surfaces.

The foregoing and/or other aspects and advantages of the present general inventive concept may also be achieved by providing a scanning apparatus including a scanning apparatus body, a document board installed on an upper surface of the scanning apparatus body, an image reading sensor unit installed inside the document board to read an image from an original document set on the document board, a driving device to transfer the image reading sensor unit, and a guide device to guide the transferring of the image reading sensor unit. The guide device includes a guide holder installed at the image reading sensor unit and a guide rail installed at the scanning apparatus body. The guide holder slide-contacts the guide rail, and slide contact surfaces on which the guide holder contacts the guide rail are plane.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIGS. 4A through 7D are views illustrating transferring guide devices usable with an image reading sensor unit of the scanning apparatus of FIG. 3, according embodiments of the present general inventive concept.

DETAILED DESCRIPTION OF THE PREFERRED EMBODIMENTS

Certain embodiments of the present general inventive concept will be described in greater detail with reference to the accompanying drawings. In the following description, same drawing reference numerals are used for the same elements even in different drawings. The matters defined in the description such as a detailed construction and elements are nothing but the ones provided to assist in a comprehensive understanding of the general inventive concept. Thus, it is apparent that the present general inventive concept can be carried out without those defined matters. Also, well-known functions or constructions are not described in detail since they would obscure the general inventive concept in unnecessary detail.

Figure 3:
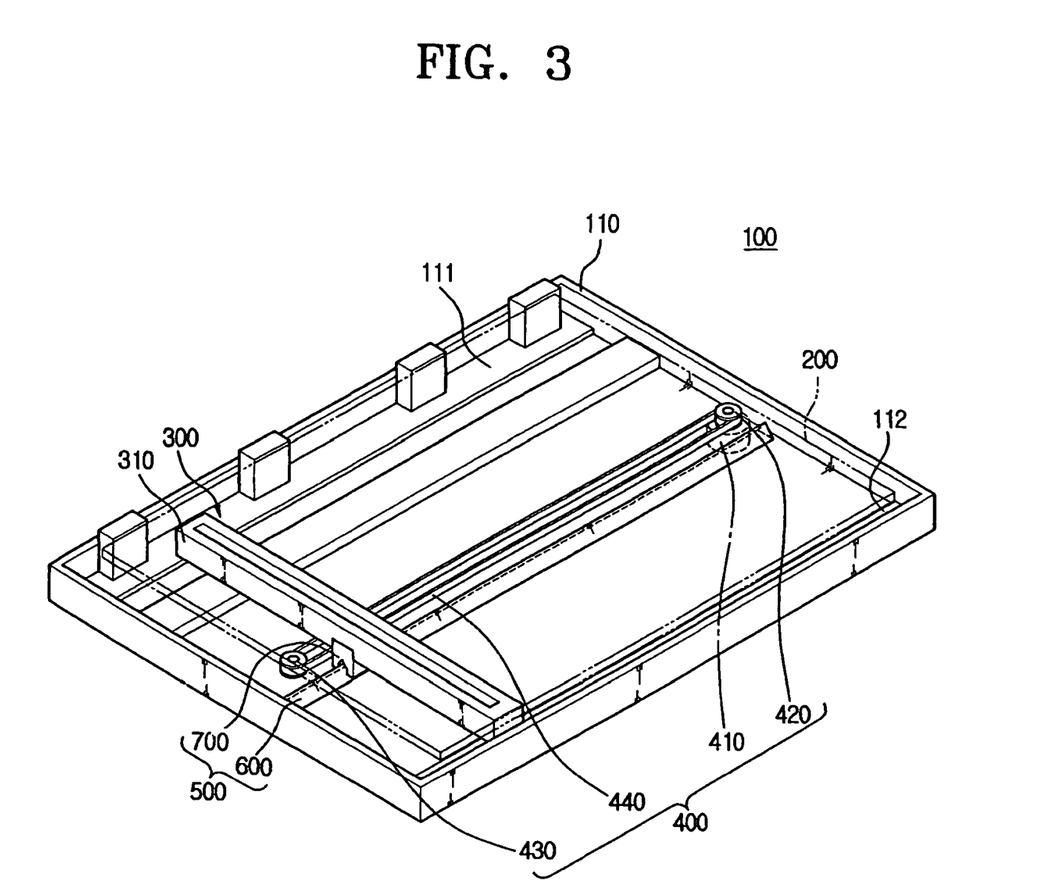
FIG. 3 is a schematic perspective view illustrating a scanning apparatus, according to an embodiment of the present general inventive concept.

FIG. 3 illustrates a scanning apparatus 100 according to an embodiment of the present general inventive concept. Referring to FIG. 3, the scanning apparatus 100 includes a scanning apparatus body 110 including a pair of support rails 111 and 112, a document board 200 on which an original document can be set, an image reading sensor unit 300 to read an image from the original document, a driving device 400 to move the image reading sensor unit 300, and a guide device 500 to guide a transfer of the image reading sensor unit 300.

The document board 200 is a transparent board on which the original document is placed, and is installed on an upper surface of the scanning apparatus body 110. Although not shown, a cover is installed at the scanning apparatus body 110 so as to open and close an upper surface of the document board 200. A reflecting board can be installed on an inner surface of the cover.

The image reading sensor unit 300 reads the image from the original document placed on the document board 200 and is installed inside the document board 200. The image reading sensor unit 300 includes a scanning carriage 310 installed at the scanning apparatus body 100 so as to be moveable in a horizontal direction of the document board 200. The scanning carriage 310 can include a light source (not shown) which irradiates a laser beam onto the original document, an image reading sensor (not shown), such as a charge coupled device (CCD) or a contact image sensor (CIS), which converts the laser beam reflected from the original document into image data, and a mirror (not shown) which guides the reflected laser beam to the image reading sensor. The scanning carriage 310 is supported by the pair of support rails 111 and 112.

The driving device 400 transfers the image reading sensor unit 300 and can include a motor 410, first and second driving pulleys 420 and 430, and a timing belt 440. The first and the second driving pulleys 420 and 430 can be installed inside the document board 200 so as to be disposed at opposite sides of the scanning apparatus body 110. The first driving pulley 420 can be coupled to the motor 410, and the first and the second driving pulleys 420 and 430 are coupled to each other via the timing belt 440. The timing belt 440 is connected with the scanning carriage 310 of the image reading sensor unit 300 and transmits a driving power of the motor 410 to the image reading sensor unit 300.

The guide device 500 guides a linear movement of the image reading sensor unit 300 transferred by the driving device 400 and includes a guide rail 600 and a guide holder 700. The guide rail 600 can be installed at the scanning apparatus body 110, and the guide holder 700 can be installed at the image reading sensor unit 300. The guide device 500 may have various shapes so as to smoothly transfer the image reading sensor unit 300.

FIGS. 4A through 7D are views illustrating guide devices, according to various embodiments of the present general inventive concept.

Figure 4A:
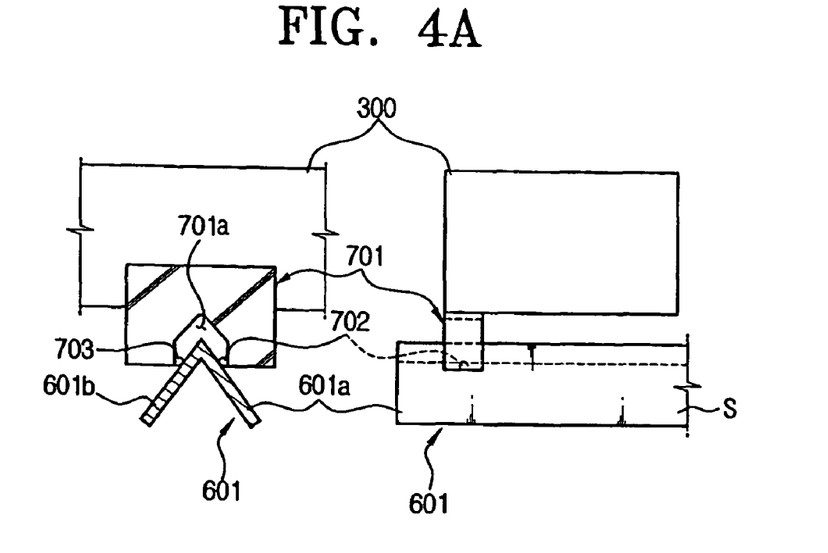

In a guide device illustrated in FIG. 4A, according to an embodiment of the present general inventive concept, a guide rail 601 includes first and second rail members 601a and 601b coupled to each other to form a predetermined angle. Slide contact surfaces S are formed at the first and the second rail members 601a and 601b. A guide groove 701a is formed in the guide holder 701, and first and second contact protrusions 702 and 703 are formed inside the guide groove 701a. Thus, the first and the second contact protrusions 702 and 703 protruding inside the guide groove 701a contact the slide contact surfaces S of the first and the second rail members 601a and 601b. Therefore, the first contact protrusion 702 contacts the first rail member 601a, and the second contact protrusion 703 contacts the second rail member 601b. As a result, the guide holder 701 contacts the guide rail 601 at two contact points. The guide groove 701a may further include a plurality of contact protrusions to increase contact points at which the guide holder 701 contacts the guide rail 601.

Figure 4B:
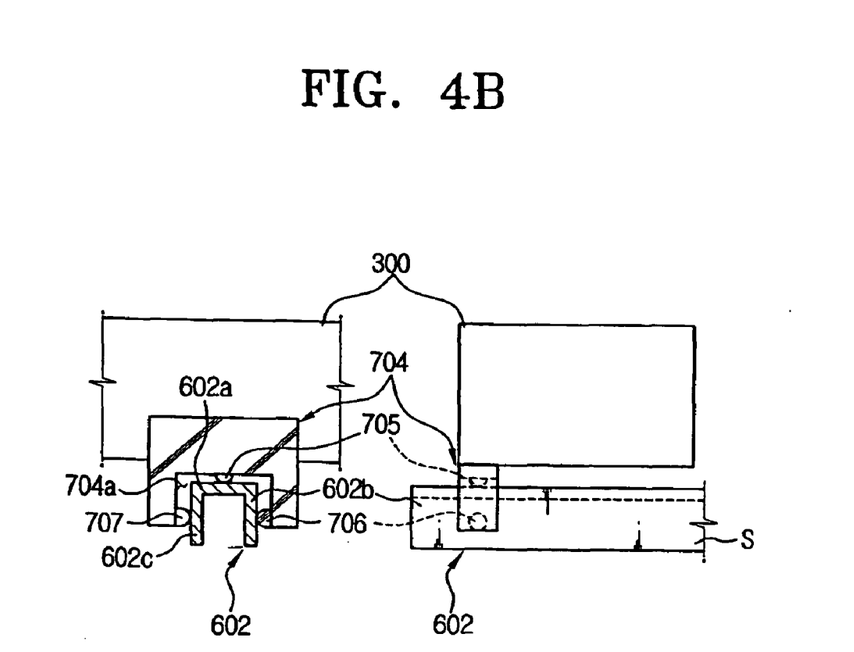

In a guide device illustrated in FIG. 4B, according to another embodiment of the present general inventive concept, a guide rail 602 includes first, second, and third rail members 602a, 602b, and 602c, and a guide holder 704 includes first, second, and third contact protrusions 705, 706, and 707. The first rail member 602a is parallel with the document board 200 (see FIG. 3), and the second and third rail members 602b and 602c are coupled to opposite ends of the first rail member 602a so as to form predetermined angles with the first rail member 602a. The first, second, and third rail members 602a, 602b, and 602c, respectively, each include slide contact surfaces S. The second and third rail members 602b and 602c may be perpendicular to the first rail member 602a, but the angle between the first and the second rail members 602a and 602b and the angle between the first and the third members 602a and 602c may vary. A guide groove 704a is formed in the guide holder 704, and the first, second, and third contact protrusions 705, 706, and 707 are formed on an inner upper surface and inner right and left sides of the guide groove 704a, respectively. An upper portion of the guide rail 602 protrudes inside the guide groove 704a, the first contact protrusion 705 contacts the first rail member 602a, the second contact protrusion 706 contacts the second rail member 602b, and the third rail protrusion 707 contacts the third rail member 602c. As described above, the guide holder 704 can contact the guide rail 602 at three contact points. However, a number of contact protrusions may increase to increase a number of contact points at which the guide holder 704 contacts the guide rail 602.

Figure 5A:
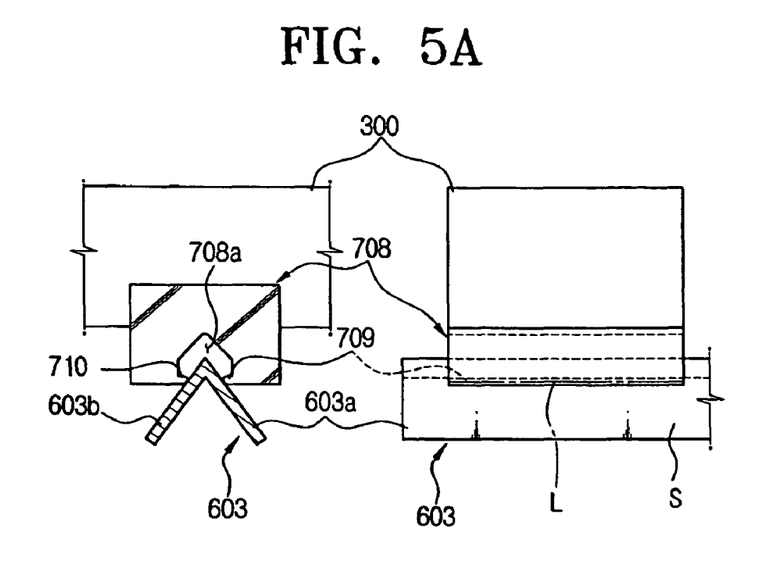

In a guide device illustrated in FIG. 5A, according to another embodiment of the present general inventive concept, a guide rail 603 includes first and second rail members 603a and 603b coupled to each other to form a predetermined angle. A guide groove 708a including first and second contact ribs 709 and 710 is formed in a guide holder 708. The first and the second rail members 603a and 603b include slide contact surfaces S to contact the first and the second contact ribs 709 and 710, respectively. An upper portion of the guide rail 603 protrudes inside the guide groove 708a, the first contact rib 709 contacts the first rail member 603a, and the second contact rib 710 contacts the second rail member 603b. Linear contact portions L are formed where the first and the second contact ribs 709 and 710 contact the first and the second rail members 603a and 603b. A length of the first and the second contact ribs 709 and 710 may be substantially equal to a thickness of the image reading sensor unit 300. However, the length of the first and second contact ribs 709 and 710 may vary.

Figure 5B:
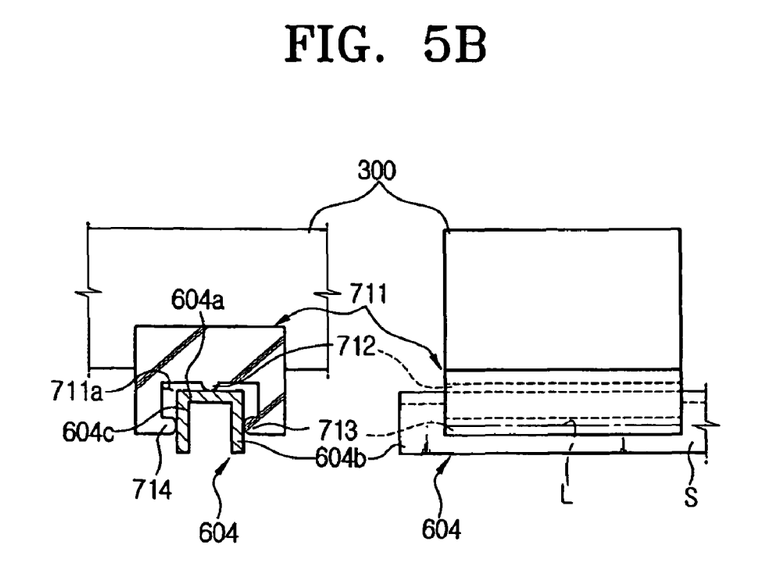

A guide device illustrated in FIG. 5B, according to another embodiment of the present general inventive concept, includes a guide rail 604 including first, second, and third rail members 604a, 604b, and 604c having slide contact surfaces S and a guide holder 711 including a guide groove 711a and first, second, and third contact ribs 712, 713, and 714. The first rail member 604a is parallel with the document board 200 (see FIG. 3), and the second and the third rail members 604b and 604c are coupled to opposite ends of the first rail member 604a to form predetermined angles with the first rail member 604a. The second and the third rail members 604b and 604c may form right angles with the first rail member 604a, but may alternately form various other angles with the first rail member 604a. The first, second, and third contact ribs 712, 713, and 714 are formed on an inner upper surface and inner right and left sides of the guide groove 711a so as to correspond to the first, second, and third rail members 604a, 604b, and 604c, respectively. Thus, the first contact rib 712 contacts the first rail member 604a, the second contact rib 713 contacts the second rail member 604b, and the third contact rib 714 contacts the third rail member 604c, and linear contact portions L are formed where the first, the second, and third contact ribs 712, 713, and 714 contact the first, second, and third rail members 604a, 604b, and 604c.

In each of the guide devices illustrated in FIGS. 4A, 4B, 5A, and 5B, a guide groove is formed in a guide holder, a guide rail may be a metal pressed material or a plastic molded material, and the guide holder may formed of a metal or plastic material.

Figure 5C:
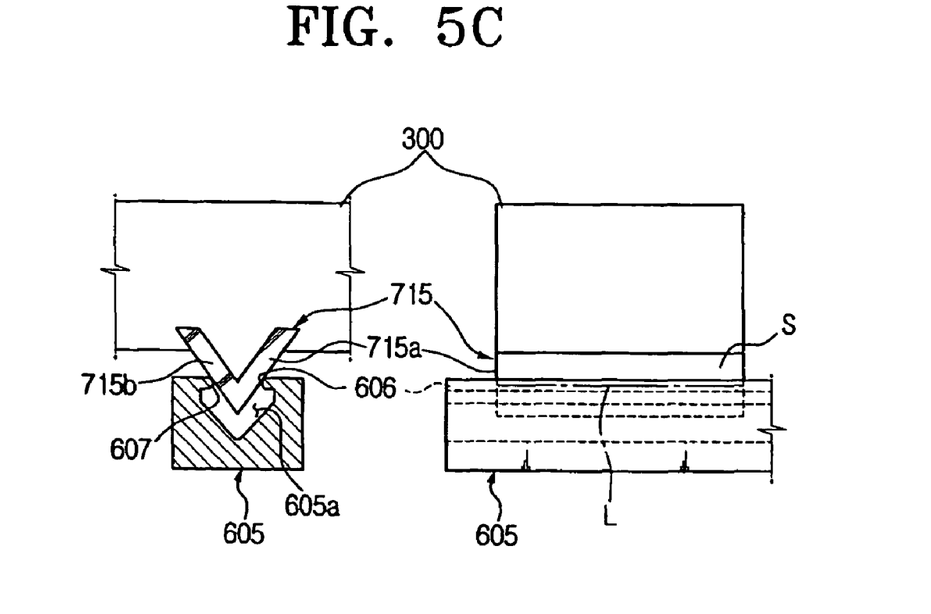

In a guide device illustrated in FIG. 5C, according to another embodiment of the present general inventive concept, a guide holder 715 includes first and second holder members 715a and 715b each including ends coupled to each other to form a predetermined angle and having slide contact surfaces S. A guide groove 605a is formed in a guide rail 605, and first and second contact ribs 606 and 607 are formed inside the guide groove 605a. Thus, the first contact rib 606 contacts the first holder member 715a, and the second contact rib 607 contacts the second holder member 715b. Linear contact portions L are formed where the first and the second contact ribs 606 and 607 contact the first and the second holder members 715a and 715b.

Figure 5D:
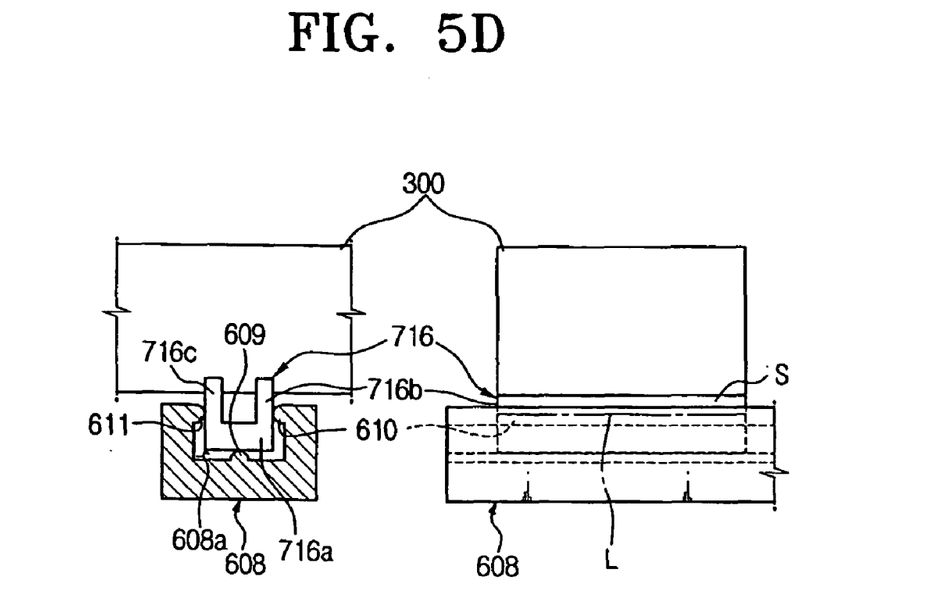

In a guide device illustrated in FIG. 5D, according to another embodiment of the present general inventive concept, a guide holder 716 includes first, second, and third holder members 716a, 716b, and 716c each having slide contact surfaces S. The first holder member 716a is parallel with the document board 200 (see FIG. 3), and the second and third holder members 716b and 716c are coupled to opposite ends of the first holder member 716a so as to form predetermined angles with the first holder member 716a. The second and third holder members 716b and 716c may form right angles with the first holder member 716a, but may alternatively form various other angles with the first holder member 716a. A guide groove 608a is formed in a guide rail 608. First, second, and third contact ribs 609, 610, and 611 are formed on an inner upper surface and inner right and left sides of the guide groove 608a so as to protrude from the guide groove 608a. Thus, the first contact rib 609 contacts the first holder member 716a, the second contact rib 610 contacts the second holder member 716b, and the third contact rib 611 contacts the third holder member 608c, and linear contact portions L are formed where the first, the second, and third contact ribs 609, 610, and 611 contact the first, second, and third holder members 716a, 716b, and 716c.

In each of the guide devices illustrated in FIGS. 5C and 5D, a guide holder may be a metal pressed material or a plastic molded material, and a guide rail may be formed of a metal or plastic material.

Figure 6A:
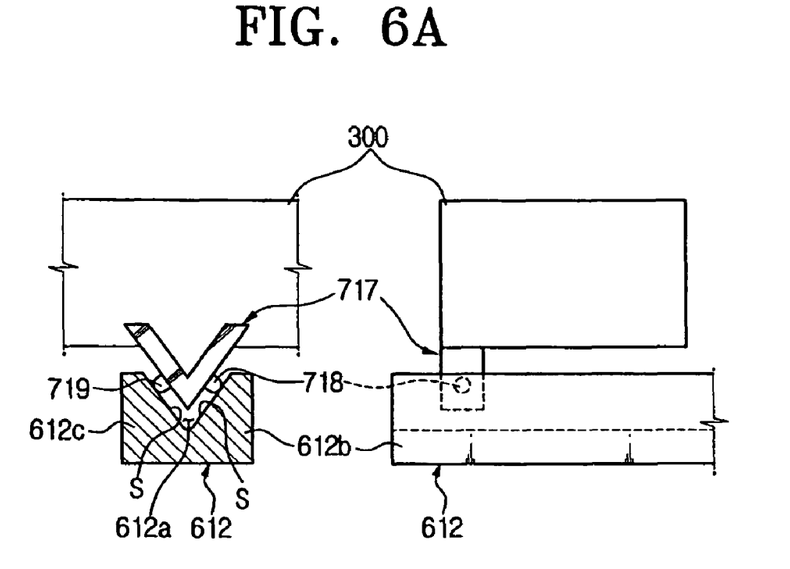

A guide device illustrated in FIG. 6A, according to another embodiment of the present general inventive concept, includes a guide rail 612 including first and second rail members 612b and 612c coupled to each other to form a predetermined angle. The first and the second rail members 612b and 612c have slide contact surfaces S, and a guide groove 612a is formed between the first and the second rail members 612b and 612c. A guide holder 717 includes first and second contact protrusions 718 and 719 contacting the slide contact surfaces S of the first and the second rail members 612b and 612c, respectively.

Figure 6B:
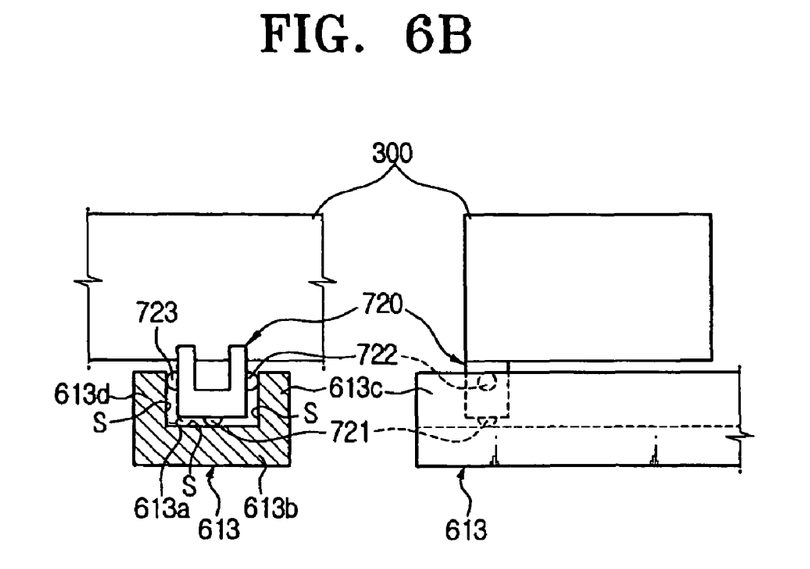

In a guide device illustrated in FIG. 6B, according to an embodiment of the present general inventive concept, a guide rail 613 includes first, second, and third rail members 613b, 613c, and 613d, and a guide groove 613a is formed in the guide rail 613 and defined by the first, second, and third rail members 613b, 613c, and 613d. The first, second, and third rail members 613b, 613c, and 613d include slide contact surfaces S. A guide holder 720 includes a first, second, and third contact protrusions 721, 722, and 723 contacting the slide contact surfaces S of the first, second, and the third rail members 613b, 613c, and 613d, respectively. The guide holder 720 may be coupled to the guide rail 613 so that an angle between the first and the second rail members 613b and 613c and an angle between the first and the third rail members 613b and 613d are right angles, or other angles.

Figure 7A:
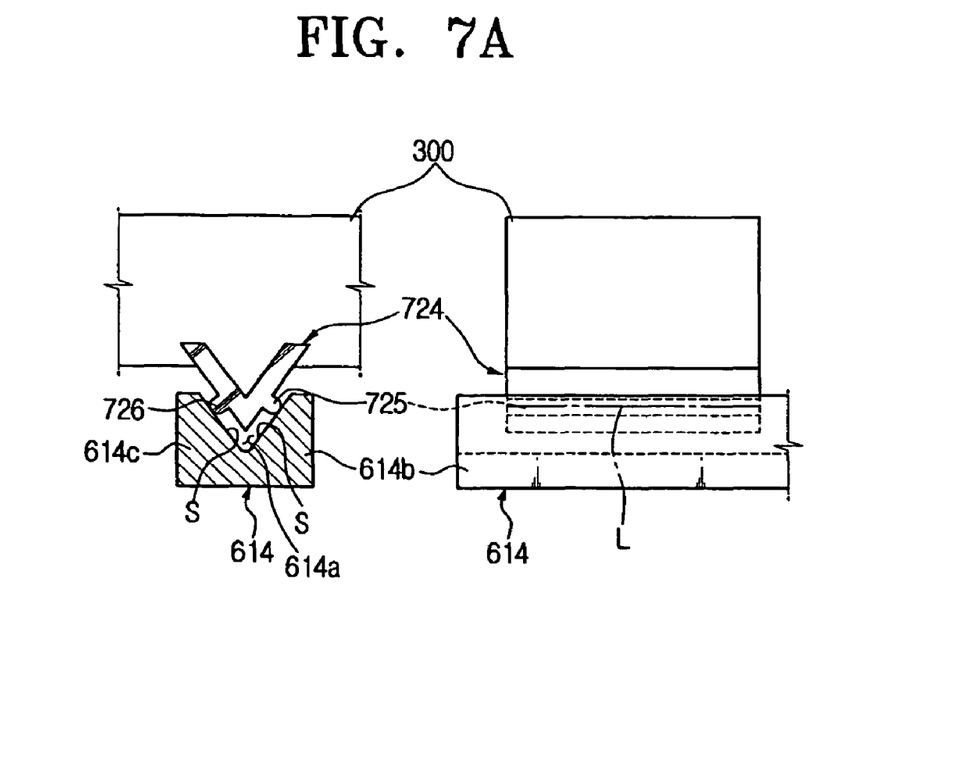

A guide device illustrated in FIG. 7A, according to another embodiment of the present general inventive concept, includes a guide groove 614a formed between first and second rail members 614b and 614c of a guide rail 614, and a guide holder 724 includes first and second contact ribs 725 and 726 contacting slide contact surfaces S of the first and second rail members 614b and 614c. Thus, linear contact portions L are formed between the first and the second rail members 614b and 614c and the first and the second contact ribs 725 and 726.

Figure 7B:
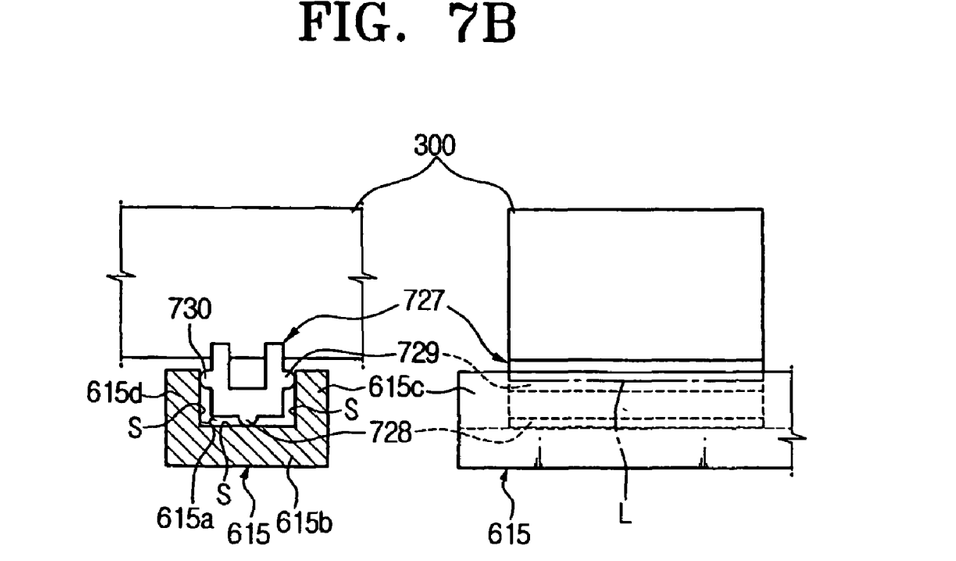

A guide device illustrated in FIG. 7B, according to another embodiment of the present general inventive concept, includes a guide groove 615a formed in a guide rail 615 including a first, second, and third rail members 615b, 615c, and 615d having slide contact surfaces S. A guide holder 727 includes a first, second, and third contact ribs 728, 729, and 730 contacting the first, second, and third rail members 615b, 615c, and 615d. Thus, linear contact portions L are formed where the first, second, and third rail members 615b, 615c, and 615d contact the first, second, and third contact ribs 728, 729, and 730.

Figure 7C:
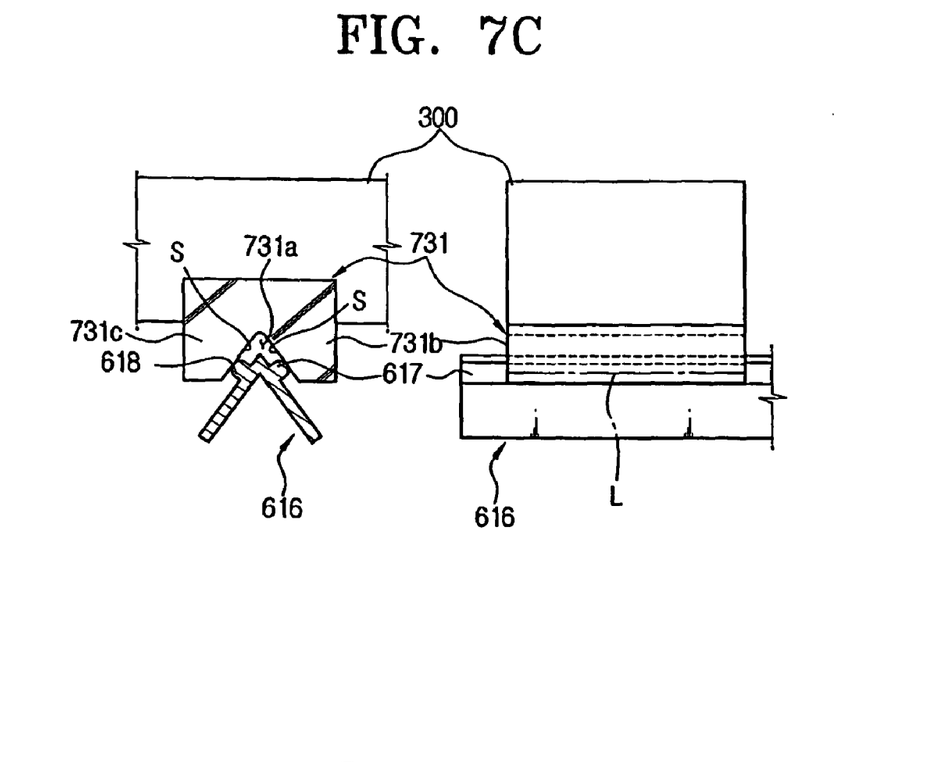

In a guide device illustrated in FIG. 7C, according to another embodiment of the present general inventive concept, a guide groove 731a is formed in a guide holder 731. The guide holder 731 includes first and second holder members 731b and 731c having slide contact surfaces S. A guide rail 616 includes first and second contact ribs 617 and 618 contacting the first and the second holder members 731b and 731c contacting the first and second holder members 731b and 731c. Thus, linear contact portions L are formed where the first contact rib 617 contacts the slide contact surface S of the first holder member 731b and where the second contact rib 618 contacts the slide contact surface S of the second holder member 731c.

Figure 7D:
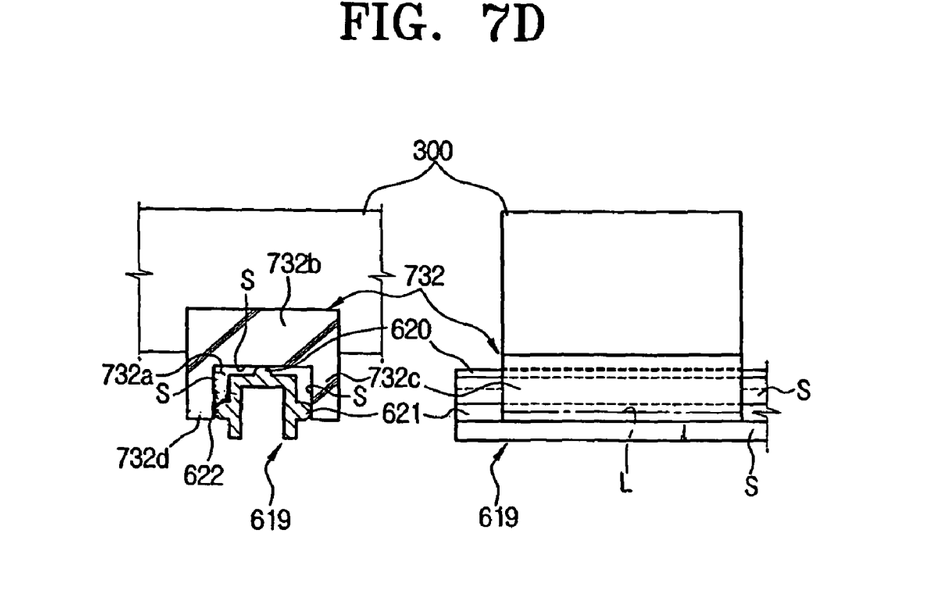

In a guide device illustrated in FIG. 7D, according to another embodiment of the present general inventive concept, a guide holder 732 includes first, second, and third holder members 732b, 732c, and 732d. The first, second, and third holder members 732b, 732c, and 732d include slide contact surfaces S, and a guide groove 732a is formed in the guide holder 732 and defined by the first, second, and third holder members 732b, 732c, and 732d. A guide rail 619 includes first, second, and third contact ribs 620, 621, and 622 contacting the first, second, and third holder members 732b, 732c, and 732d. Thus, linear contact portions L are formed where the slide contact surfaces S of the first, second and third holder members 732b, 732c, and 732d contact the first, second and third contact ribs 620, 621, and 622.

As described above, according to the various embodiments of the present general inventive concept, a guide rail and a guide holder guiding transferring of an image reading sensor unit can point-contact or line-contact each other. Thus, a friction force among elements of the guide rail and guide holder is minimized. As a result, the image reading sensor unit can be smoothly transferred, and partial wear caused by the friction force among the elements can be reduced, which improves the reliability of a scanning apparatus.

Also, a transferring guide device useable with an image reading sensor unit according to the embodiments of the present general inventive concept can contribute to reducing manufacturing time and cost of an image reading sensor unit.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A transferring guide device to guide movement of an image reading sensor unit installed in a scanning apparatus body, comprising:
   a guide holder installed at the image reading sensor unit; and
   a guide rail installed at the scanning apparatus body to slidably support the guide holder,
   wherein one of the guide holder and the guide rail includes planar slide contact surfaces, and
   wherein the slide contact surfaces are formed at the guide rail, the guide holder comprises a guide groove and at least one contact protrusion protruding from the guide groove, and the at least one contact protrusion is slidably disposed on the guide rail.

2. The transferring guide device as claimed in claim 1, wherein the guide rail comprises first and second rail members coupled to each other to form a predetermined angle, and the guide holder comprises a plurality of contact protrusions to contact the first and the second rail members, respectively.

3. The transferring guide device as claimed in claim 1, wherein the guide rail comprises a first rail member, and second and a third rail members coupled to opposite ends of the first rail member to form predetermined angles with the first rail member, and the guide holder comprises a plurality of contact protrusions to contact the first, second, and third rail members, respectively.

4. A transferring guide device to guide movement of an image reading sensor unit installed in a scanning apparatus body, comprising:
   a guide holder installed at the image reading sensor unit; and
   a guide rail installed at the scanning apparatus body to slidably support the guide holder,
   wherein one of the guide holder and the guide rail includes planar slide contact surfaces, and
   wherein the slide contact surfaces are formed at the guide rail, the guide holder comprises a guide groove and at least one contact rib protruding from the guide groove, and the at least one contact rib is slidably disposed on the guide rail.

5. The transferring guide device as claimed in claim 4, wherein the guide rail comprises first and second rail members coupled to each other to form a predetermined angle, and the guide holder comprises a plurality of contact ribs to contact the first and second rail members, respectively.

6. The transferring guide device as claimed in claim 4, wherein the guide rail comprises a first rail member, and second and third rail members coupled to opposite ends of the first rail member to form predetermined angles with the first rail member, and the guide holder comprises a plurality of contact ribs to contact the first, second, and third rail members, respectively.

7. A transferring guide device to guide movement of an image reading sensor unit installed in a scanning apparatus body, comprising:
   a guide holder installed at the image reading sensor unit; and
   a guide rail installed at the scanning apparatus body to slidably support the guide holder,
   wherein one of the guide holder and the guide rail includes planar slide contact surfaces, and
   wherein the slide contact surfaces are formed at the guide holder, the guide rail comprises a guide groove and at least one contact rib protruding from the guide groove, and the slide contact surfaces of the guide holder are slidably disposed on the at least one contact rib.

8. The transferring guide device as claimed in claim 7, wherein the guide holder comprises first and second holder members coupled to each other to form a predetermined angle, and the guide rail comprises a plurality of contact ribs to contact the first and second holder members, respectively.

9. The transferring guide device as claimed in claim 7, wherein the guide holder comprises a first holder member, and second and third holder members coupled to opposite ends of the first holder member to form predetermined angles with the first holder member, and the guide rail comprises a plurality of contact ribs to contact the first, second, and third holder members, respectively.

10. The transferring guide device as claimed in claim 7, wherein the guide rail comprises a guide groove, the slide contact surfaces are formed at the guide groove, and the guide holder comprises contact protrusions contacting the slide contact surfaces.

11. The transferring guide device as claimed in claim 10, wherein the guide rail comprises first and second rail members coupled to each other to form a predetermined angle, and the guide holder comprises a plurality of contact protrusions to contact the first and second rail members, respectively.

12. The transferring guide device as claimed in claim 10, wherein the guide rail comprises a first rail member, and second and third rail members coupled to opposite ends of the first rail member to form predetermined angles with the first rail member, and the guide holder comprises a plurality of contact protrusions to contact the first, second, and third rail members, respectively.

13. A transferring guide device to guide movement of an image reading sensor unit installed in a scanning apparatus body, comprising:
   a guide holder installed at the image reading sensor unit; and a guide rail installed at the scanning apparatus body to slidably support the guide holder, wherein one of the guide holder and the guide rail includes planar slide contact surfaces, and wherein the guide rail comprises a guide groove, the slide contact surfaces are formed at the guide groove, and the guide holder comprises contact ribs contacting the slide contact surfaces.

14. The transferring guide device as claimed in claim 13, wherein the guide rail comprises first and second rail members coupled to each other to form a predetermined angle, and the contact ribs contact the first and second rail members, respectively.

15. The transferring guide device as claimed in claim 13, wherein the guide rail comprises a first rail member, and second and a third rail members coupled to opposite ends of the first rail member to form predetermined angles with the first rail member, and the guide holder comprises a plurality of contact ribs to contact the first, second, and third rail members, respectively.

16. The transferring guide device as claimed in claim 13, wherein the guide holder comprises a guide groove, the slide contact surfaces are formed at the guide groove, and the guide rail comprises contact ribs contacting the slide contact surfaces.

17. The transferring guide device as claimed in claim 16, wherein the guide holder comprises first and second holder members coupled to each other to form a predetermined angle, and the guide rail comprises a plurality of contact ribs to contact the first and second holder members, respectively.

18. The transferring guide device as claimed in claim 16, wherein the guide holder comprises a first holder member, and second and third holder members coupled to opposite ends of the first holder member to form predetermined angles with the first holder member, and the guide rail comprises a plurality of contact ribs to contact the first, second, and third holder members, respectively.

19. A scanning apparatus comprising:
a scanning apparatus body,
a document board installed on an upper surface of the scanning apparatus body,
an image reading sensor unit installed inside the document board to read an image from an original document set on the document board,
a driving device to move the image reading sensor unit, and
a guide device to guide the movement of the image reading sensor unit,
wherein the guide device comprises:
a guide holder installed at the image reading sensor unit; and
a guide rail installed at the scanning apparatus body to slidably support the guide holder,
wherein one of the guide holder and the guide rail includes planar slide contact surfaces.

20. A scanning apparatus comprising:
a scanning apparatus body;
a document board disposed on an upper surface the scanning apparatus body;
an image reading sensor unit slidably installed in the scanning apparatus body; and
a guide unit to connect the image reading sensor unit to the scanning apparatus body and to guide movement of the image reading sensor unit, wherein the guide unit comprises a protruding portion protruding from one of the image reading sensor unit and the scanning apparatus body, and an accommodating portion disposed at the other one of the image reading sensor unit and the scanning apparatus body to accommodate the protruding portion.

21. The scanning apparatus as claimed in claim 20, wherein the protruding portion comprises one of a triangle shape and a rectangle shape, and the accommodating portion is shaped to accommodate the protruding portion.

22. The scanning apparatus as claimed in claim 20, wherein an outer surface of the protruding portion is smooth to slide along the accommodating portion.

23. The scanning apparatus as claimed in claim 22, wherein the accommodating portion comprises a plurality of contact portions protruding from an inner surface of the accommodating portion to contact the protruding portion.

24. The scanning apparatus as claimed in claim 22, wherein the accommodating portion comprises a plurality of rails protruding from an inner surface of the accommodating portion over an entire length of the accommodating portion to contact the protruding portion.

25. The scanning apparatus as claimed in claim 20, wherein an inner surface of the accommodating portion is smooth to allow the protruding portion to slide through the accommodating portion.

26. The scanning apparatus as claimed in claim 25, wherein the protruding portion comprises a plurality of contact portions protruding from an outer surface of the protruding portion to contact the inner surface of the accommodating portion.

27. The scanning apparatus as claimed in claim 25, wherein the protruding portion comprises a plurality of rails protruding from an outer surface of the protruding portion over an entire length of the protruding portion to contact the inner surface of the accommodating portion.

28. A scanning apparatus, comprising:
a scanning apparatus body;
an image reading sensor unit installed within the scanner apparatus body to read an image from an original document;
a guide device to guide a movement of the image reading sensor unit, the guide device comprising:
a guide rail having a plurality of surfaces installed at the scanning apparatus; and
a guide holder having a plurality of surfaces installed at the image reading sensor unit, the guide holder being slidably disposed on the guide rail.

* * * * *